June 22, 1965  L. VAN DER MEULEN  3,190,049
METHOD AND APPARATUS FOR FORMING A
PACKAGE FROM SHEET MATERIAL
Filed April 12, 1961  4 Sheets-Sheet 1

LEONARD VAN DER MEULEN
INVENTOR.

BY
ATTORNEY

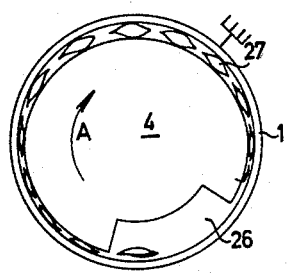
FIG: 3a.
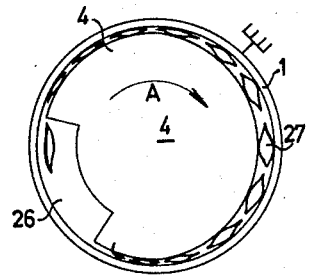
FIG: 3b.
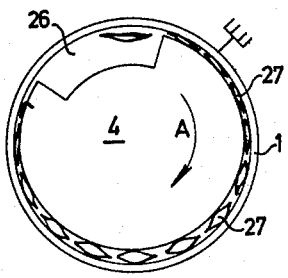
FIG: 3c.
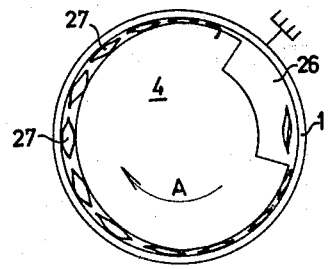
FIG: 3d.
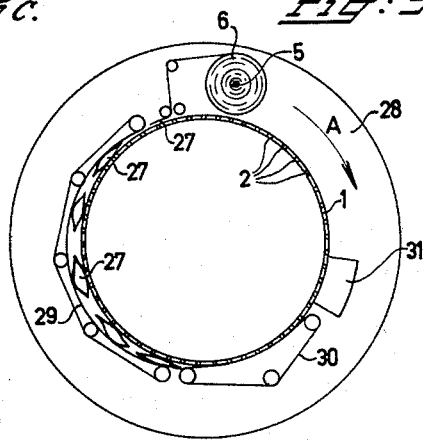
FIG: 4.

June 22, 1965

L. VAN DER MEULEN 3,190,049

METHOD AND APPARATUS FOR FORMING A
PACKAGE FROM SHEET MATERIAL

Filed April 12, 1961

LEONARD VAN DER MEULEN
INVENTOR.

BY

ATTORNEY

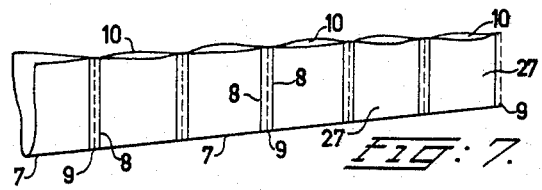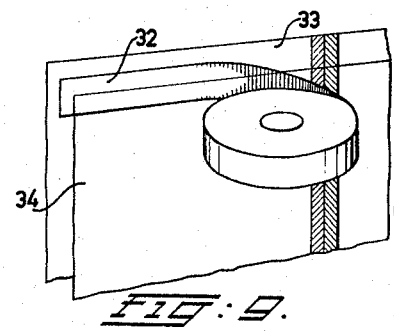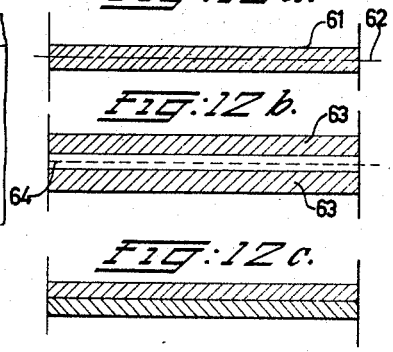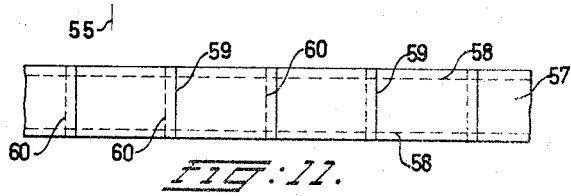

3,190,049
METHOD AND APPARATUS FOR FORMING A
PACKAGE FROM SHEET MATERIAL
Leonard van der Meulen, Oranje Nassaulaan 30,
Amsterdam, Netherlands
Filed Apr. 12, 1961, Ser. No. 102,522
Claims priority, application Netherlands, Apr. 13, 1960,
250,471
26 Claims. (Cl. 53—29)

The invention relates to a method and a device for treatment at regular intervals of a continuously supplied strip of shaped pliable sheet material, and further relates to a strip of material treated in such a way and to bags or filled bags obtained with the method according to the invention.

It is customary to transport and store strip material in a rolled up state, and the strip of material is unwound and operated upon during movement when it is to be subjected to any desired treatment. Although treament of a moving strip of material in many cases does not give rise to difficulties in practice and often proves advantageous, there are, however, treatments for which the movement of the unwound strip is utterly disadvantageous and even makes necessary extremely complicated methods and installations. Such complicated methods and installations are unreliable in operation, and are difficult and time consuming to adjust. The above disadvantages involved in the treatment of a moving strip occur in particular in connection with treatments which, when considered in relation to the velocity of motion of the strip of material, require considerable time, such as printing and drying, heat sealing, filling and closing of bags, weighing, and the like. In seeking to solve the problems involved in such treatments, an intermittent movement is frequently imparted to the strip or parts thereof. However, the problems arising from such intermittent movements, for example, the need to provide devices capable of withstanding large acceleration and deceleration forces, then need to be solved.

It is an object of the invention to avoid the above difficulties and to provide ways and means by which a continuously supplied strip of material and/or parts thereof can be operated upon and delivered in a simple and efficient way. The method according to the invention is characterized in that the location of delivery of the rolled up material is continuously moved along a closed path, and parts of the unwound material are successively seized and treated at stationary locations along that path whereupon the treated parts of the material are released. Because the material after being delivered from the roll is stationary for a considerable time, one or more treatments of this material can be easily carried out. A particularly simple arrangement is obtained when the closed path, along which the rolled up material is delivered, is circular, in which case the delivered material can be retained against a cylindrical casing while being treated or operated upon, and the locations at which the strip is treated are all equidistantly spaced with respect to a central point, that is, the center of the circular path, so that very little space is required for the application of the method.

In some cases it is advantageous to carry out the method according to the invention in such manner that the rolled up material is delivered at a speed which is lower than the linear velocity at which the place of delivery is moved along the closed path. This is particularly important when the strip of material is to be stretched or divided into separate pieces which are operated upon at fixed spaced apart location. However, in accordance with a preferred embodiment of the invention, the rolled up material is delivered at a speed which is higher than the velocity at which the place of delivery of the material is moved along the closed path, so that an excess of material is delivered in relation to the places of treatment, and thus loops can be formed, or parts of the strip which initially were situated one behind the other can be made to adhere to each other.

The method according to the invention is particularly applicable to the opening, filling and closing of bags which are joined together along weakened lines to form a strip, and which have their openings situated along an edge of the strip. In applying the method to such bags, the rolled up strip of bags is unwound, and the bags are separated and successively seized by a side wall in the vicinity of the bag openings, whereupon the other side wall of each bag near to the opening thereof is seized and both side walls are moved apart to open the mouth of each bag, after which the stationary, opened, bags are filled and both side walls are again pressed together in the vicinity of the opening or mouth of each bag and caused to adhere to each other thereby to seal the bag. As a result of this method it is possible to achieve filling of the bags while the latter are stationary, and yet continuous treatment of the series of bags takes place so that a high rate of output can be easily realized.

The method according to the invention is also especially suitable for the manufacture of bags from a multiply strip of material, for instance thermoplastic film. In accordance with this method, the rolled up strip of material, upon being unwound, is successively pinched or pressed at small areas extending across the longitudinal direction of the strip and these areas of the strip are heated in order to unite the layers or plies, whereupon the pressure is relaxed and the material released. Since the heat sealing or joining of the layers of the strip will take some time and is accompanied by the exertion of a sufficient pressure, which pressure is continuously applied until the heat seal has sufficiently cooled, the existing methods were necessarily discontinuous. According to the invention it is possible to provide a broad welding seam at the location of pinch, which seam is perforated near the middle and along its entire length, whereby a chain of bags is formed from which each bag can be easily torn. When using materials which are not suitable to be severed by means of perforations, as e.g. polyethylene, the center of each welded seam is exposed to a greater pressure during heating in such a way that a weakened line is formed along which the material can be easily torn. If desired, the pressure and heat applied along the center of each weld can be sufficiently high to cut through the multiple layers or plies of the strip material, so that separate bags are thus produced.

With the method according to the invention it is possible for the bags formed by heat sealing of the layers of the strip material to remain united in the form of a chain, and, in that event, the material, after release of the treated parts is removed at a discharge station which is moved along the same closed path as the place of delivery, with the material being rolled up at the discharge station.

An apparatus or installation embodying this invention generally comprises a device for unwinding a roll of flexible sheet or strip material, driven members for continuously feeding and delivering the material, and also members for seizing treating and subsequently releasing the material, with the members for unwinding the roll and for feeding and delivering the strip material being preferably disposed on a driven bearer which is mounted for rotation about a stationary axis, while the members for seizing and retaining, treating and subsequently releasing the strip material are preferably arranged around a circle which is concentric with the axis of the bearer.

According to the invention the members for seizing and retaining the material preferably comprise a driven endless belt, which is supported on the bearer and guided so that a part thereof exerts a constant pressure on a number of stationary bags or other elements held against an adjacent fixed casing, so that the material is fixedly retained while the number of moving parts is held to a minimum.

The member for unwinding the roll of material, for instance a spindle or the like, is perferably mounted on the rotatable central bearer with the axis of the spindle parallel to the axis of the bearer. As a result of this arrangement, a very compact and easily operated construction is obtained. The bearer and the elements and devices mounted thereon can be disposed outside of the circularly arranged stationary elements, or within the latter.

In a device embodying the invention for opening, filling and then closing bags which are joined together along weakened lines so as to form a strip or chain having the openings of the bags situated along an edge of the strip, there is provided concentric with the axis of rotation of the central bearer a stationary cylinder casing with suction apertures so that one side of each bag of the strip is held fast to the surface of the casing, and an endless belt with suction apertures is disposed on the bearer and guided so that, at two locations, it is adjacent to the cylinder casing and, between these two locations, the belt is moved away from the cylinder casing. In this device, the chain of bags is unwound and the bags are severed from each other and held, at one side, against the suction apertures of the casing while the other side of each bag is held against the suction apertures of the belt so that, as the latter moves away from the casing, the bag is opened to permit filling thereof by a filling device, whereupon the bag is closed and the opening sealed.

Although the stationary bags with opened mouths could be filled in many ways, a preferred embodiment of the invention has the discharge outlets or spouts of filling machines disposed above the space between the cylinder casing and that part of the belt which is spaced therefrom. The device is most appropriate for use in connection with bags of thermoplastic material and the closing device comprises cooperating pressure and heating means disposed on the stationary cylinder casing and bearer. By means of this arrangement it is possible to close the bags one after another in a very safe way, as there is sufficient time for heating and cooling under pressure. According to the invention the bags can also be closed in a very simple and efficient way by a closing device which comprises an element for unwinding adhesive tape which is disposed on the bearer and a delivery place adjacent to the cylinder wall. If this adhesive tape is pressure sensitive and the bag is made of polyethylene or like material, the bag can be resealed after having been opened. When the device is provided with heat sealing elements for closing the bags, a preferred embodiment has the heating elements disposed on the cylinder casing and consisting of separately excited hot straps of electrical resistance wire, which together form a ring on the circumference of the cylinder casing, while the pressure means is constituted by the cylinder casing and by an endless belt, which is mounted on the bearer and has a run bearing against the cylinder wall, the belt being driven so that the run bearing against the cylinder wall is staionary with respect thereto.

The device according to the invention preferably initially imparts a relatively low speed to the chain of bags withdrawn from the roll, whereupon the chain is seized by the delivery elements imparting a higher speed to the seized bag which is equal to the linear circumferential speed of the bearer, so that the seized bag is severed from the chain and the separate bags are deposited in spaced apart relation on the stationary cylinder casing.

In a device according to the invention which is especially suitable for the manufacture of tube shaped bodies, bags and containers from a multiply strip of material, stationary heating elements, which can be separately energized, are equidistantly spaced, concentrically with respect to the axis of rotation of the bearer and parallel thereto, and a part of the unwound strip is pressed against the heating elements by an endless belt mounted on the bearer and being driven in such manner that the rim of the belt situated in the vicinity of the heating elements is stationary with respect to the latter.

In a particularly advantageous constructional embodiment of the invention, the heating elements are mounted on rodlike supports extending parallel to the axis of the central bearer, while the central bearer carries a blower which, with respect to the direction of rotation of the central bearer, is positioned behind the place of delivery of the strip of material, and limits an air blast substantially radially directed toward the heating elements. Further, the bearer carries an endless belt having a run which extends from the place of delivery in the direction opposed to the rotation of the bearer and presses against a number of the successive rod-like supports. The endless belt is driven so as to be stationary with respect to the engaged rod-like supports.

In this arrangement, the strip of material withdrawn from the roll is delivered at a uniform speed, which is higher than the uniform speed at which the place of delivery moves past the rod-like supports, and the strip is locally pressed against the heating elements and temporarily held thereon by the endless belt, while the excess of material delivered from the roll is acted upon by the air blast from the blower to form loops between the rod-like supports at which the heating elements cause the layers of the strip material to adhere one to the other through heat and pressure. With this installation bags can be rapidly produced in a perfectly safe way, and the welded seams of the bags satisfy the highest standards. The dimensions of the bags and the speed of production can be very simply regulated by varying the speed of rotation of the central bearer and/or the operative speeds of the unwinding and delivery devices for the strip of material, and these speed variations also permit regulation of the apparatus for optimum performance with materials of different thicknesses.

The above, and other objects, features and advantages of the invention, will be apparent in the following detailed description of illustrative embodiments thereof which is to be read in connection with the accompanying drawings wherein.

Figure 1:
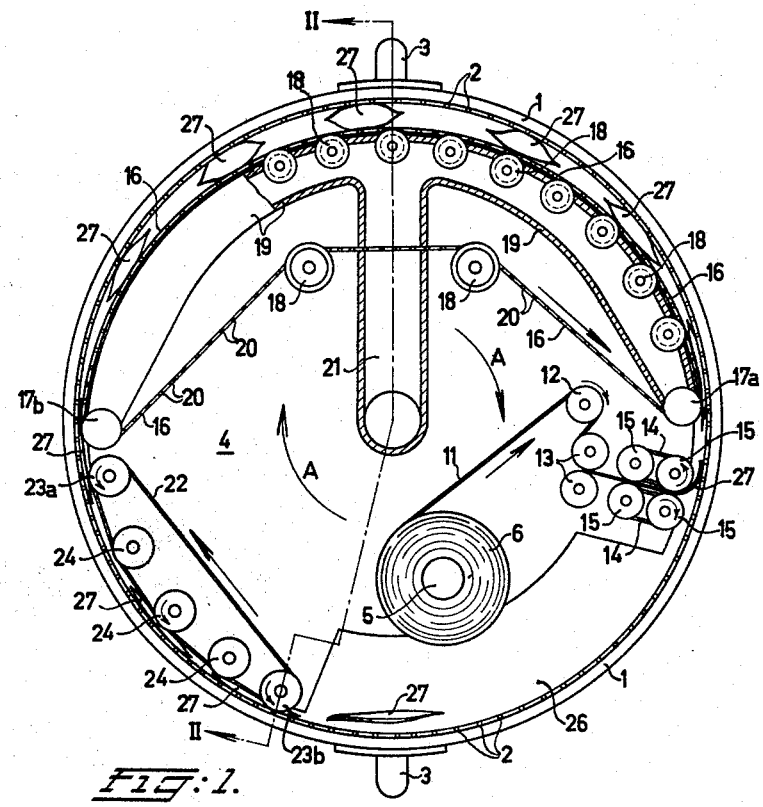
FIGURE 1 is a plan view of a diagrammatically represented installation for opening, filling and thereafter closing bags which are joined to each other along weakened lines so as to form a chain.
Figure 2:
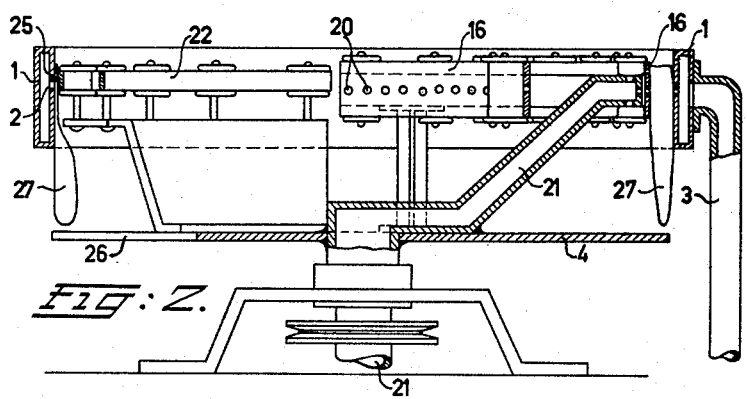
FIGURE 2 is a vertical sectional view taken along the line II—II on FIG. 1.

The FIGURES 3a-3d show diagrammatically subsequent phases of operation of the installation according to the FIGURES 1 and 2.

FIGURE 4 shows in outline a plan view of an embodiment of the installation according to the FIGURES 1 and 2.

Figure 5:
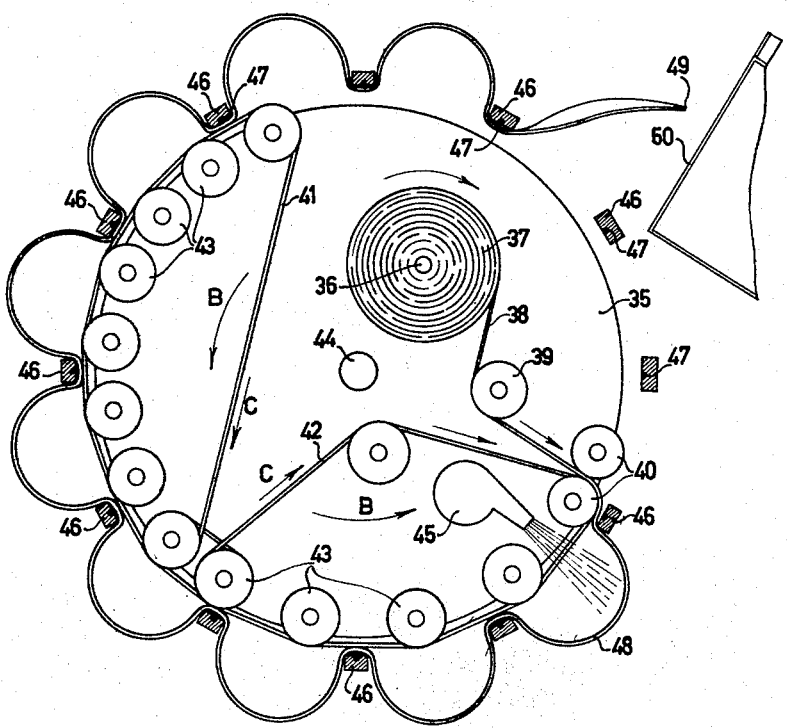

FIGURE 5 is a plan view of a diagrammatically represented installation according to the invention for the manufacture of bags from thermoplastic sheet material.

Figure 6:
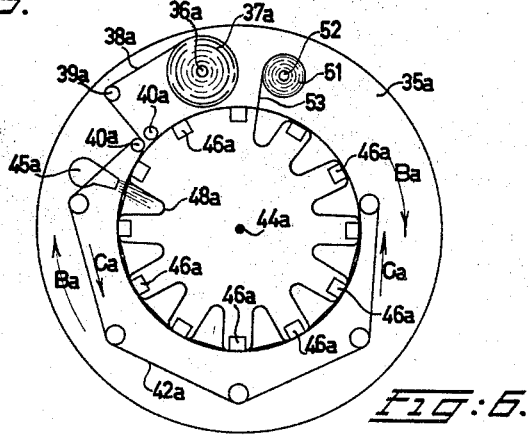

FIGURE 6 is a plan view of a diagrammatrically represented modified embodiment of the installation according to FIG. 5.

FIGURE 7 shows a chain of flat bags which are joined together along weakened lines defined by perforations.

FIGURE 8 is a cross section of a bag with a bottom fold.

FIGURE 9 shows a modified closure of a bag opening.

FIGURES 10a–10f are diagrammatic cross-sectional views of various strips of material, from which according to the invention, bags with transverse welded seams can be manufactured.

FIGURE 11 shows a series of bags formed in the longitudinal direction from tube shaped strips of material.

FIGURES 12a–12c diagrammatically show examples of welding seams which can be provided in accordance with the invention.

FIGURE 13 is a detail view illustrating the application of a preferred form of a welded seam.

The installation represented in FIGURE 1 consists of a stationary external hollow ring 1, which is provided with suction apertures 2 in its inner cylindrical surface. The suction apertures 2 are connected by tubes 3 with a source of vacuum (not shown). Mounted for rotation within the stationary ring 1 and concentric to the latter is a central bearer 4, which is rotatably driven by means (not shown). On this central bearer 4 is disposed a spindle 5 adapted to rotatably support a roll 6 formed by a chain 11 of flat bags made of thermoplastic material, for instance polyethylene. The adjacent bags of chain 11 are connected to each other along weakened lines defined by perforations, and the mouths of the bags are at the upper longitudinal edge of the chain, as shown on FIG. 7. In the illustrated chain of bags, the bottom of each bag is constituted by a longitudinal fold 7, the side seams 8 by welded strips having perforations 9 therein connecting the bags with each other, and the bag mouths are indicated by 10. The chain 11 is guided about the roll 12, which is also mounted on the bearer 4, between the driven conveyor rolls 13 and is then seized by the cooperating conveyor belts 14 which are mounted on driven rolls 15. The direction of rotation of bearer 4 is indicated by the two arrows A. The rolls 15 together with the conveyor belts 14 constitute the delivery device. Behind the delivery device, considered with respect to the direction of rotation A, there is provided an endless conveyor belt 16 running around guide rolls 17a and 17b which are adjacent the inner circumference of the hollow ring 1. Between guide rolls 17a and 17b, belt 16 has an outer run guided by rolls 18 to follow a path progressively spaced from the inner wall of the ring 1.

At least some of the guide rolls 18 are driven to effect movement of the belt 16. The belt 16 is provided with suction apertures 20 and its outer run is surrounded by a casing 19 which, by way of a duct 21, is connected with a suction device (not shown), the arrangement being such that air is sucked through the apertures 20 on the outer path or run of the belt 16 between the rolls 17a and 17b. Behind the belt 16, considered with respect to the direction of rotation A of the central bearer 4, there is provided an endless belt 22 of heat proof, elastical material, e.g. silicon rubber, which is guided by rolls 24 between rolls 23a and 23b so as to press against the inner circumference of the hollow ring 1 above the suction apertures 2 provided in a horizontal row in the hollow ring 1. Mounted on the hollow ring 1 above the suction apertures 2 is a hot strap 25, which is subdivided into separately energized sectors. Between the locations of conveyor belts 14 and of guide roll 23b, bearer 4 is provided with a discharge opening or cutout 26.

The operation of the above described installation is as follows: The central bearer 4 with the roll 6 and other members disposed thereon is driven at a definite uniform speed in the direction of the arrows A. The strip of bags 11 is simultaneously unwound from the roll disposed on the spindle 5 by the driven rolls 13 at a speed which is less than the linear circumferential speed of the bearer 4. The cooperating driven belts 14 impart a velocity to the strip 11 led there between which is greater than the initial velocity imparted by the rolls 13 to the strip 11 and equal to the linear circumferential speed of the bearer 4. As a result of the different speeds of the rolls 13 and belts 14, the strip 11 is severed at the locations weakened by the perforations 9 (FIG. 7) and each bag 27 removed in this way from the remainder of strip 11 leaves the delivery conveyor belts 14 in the immediate vicinity of the inner circumference of the ring 1 at a speed which is equal to the circumferential speed of the central bearer 4. As a result of the action of the suction through apertures 2, a wall of the bag 27 is immediately pulled against the inner wall surface of the ring 1.

On further rotation of the bearer 4, the next bag is severed from the strip and an accelerated motion imparted thereto before it is laid against the inner wall of the ring 1 at a distance from the previously delivered bag. Thus, the successive separated bags 27 are deposited at fixed spaced apart locations against the inner wall of the ring 1 and there retained by suction apertures 2.

On further rotation of the bearer device 4, the endless belt 16 passing around the roll 17a engages against the bag 27 retained by the ring 1, and the speed of movement of belt 6 is selected so that the portion lying against the bag 27 is stationary with respect thereto and consequently also with respect to the ring 1. Because the endless belt 16 is not guided in a direction parallel to the ring 1, but recedes therefrom, and as the bag wall bearing against the belt 16 is made to adhere to the latter by the suction apertures 20, the two bag walls are separated from each other on further rotation of the bearer, thereby effecting opening of the bag mouths 10. Above the fixed stations along the casing 1 at which the bags 27 are held to the latter and opened are outlets or filling or dosage machines (not shown) which are operated in synchronism with the movement of the bearer 4 to fill the successive bags during the periods when the mouths thereof are open.

On further rotation of the bearer 4 the endless belt 16 closes the mouths 10 of the filled bags as the path of the belt approaches the inner wall of the ring again at the roll 17b. When the belt 16 passes a bag 27 at the location of the roll 17b, the upper edge of the bag 27 is immediately seized by the endless belt 22 which holds the upper edge of the seized bag against the inner wall of the ring 1. The related sector of hot strap 25 disposed on the inner wall of the inner wall of the ring 1 is energized for a sufficiently long time in order to cooperate with the pressure of the belt 22 in sealing the mouth of the bag. After the sector of strap 25 effecting welding of a bag has been deenergized, belt 22 continues to hold the bag against ring 1 for a period sufficient to let the weld cool down. When the belt 22 has passed a bag 27 the latter is no longer retained and falls down through the discharge opening 26 in the bearer 4.

In FIGURES 3a–3d, the movement of the central bearer 4 within the stationary ring 1 is diagrammatically represented in positions that are angularly displaced by 90°, and it is apparent therefrom, that each of the bags 27, after delivery, stops against the ring 1, is opened and closed and falls down through the discharge opening 26.

Represented in FIGURE 4 is a modified embodiment of the installation according to FIGURES 1 and 2. In the embodiment of FIG. 4, the bearer 28 turns concentrically with respect to the stationary ring 1, but the members disposed on the bearer 28 are located outside of the circumference of the ring 1. Apart from the foregoing, the arrangement and operation of this installation are analogous to the installation described. The bearer 28 turns in the direction A. The roll 6 is unwound from the spindle 5 and the separate bags 27 are held between the endless belt 29, corresponding to belt 16, and the outer wall of the ring 1, which is provided with suction apertures 2. The bags 27 are opened, filled and closed during engagement by the belt 29. Thereafter, the filled bags are engaged by endless belt 30, corresponding to belt 22, and the openings of the filled bags are heat sealed and the weld cooled, whereupon the bags fall successively through the discharge opening 31.

The above described installations are suitable for treatment of the described simple bags and are also suitable for filling bags of another construction, e.g. bags with a bottom fold, which can be manufactured by disposing transverse welds in a strip having a cross section similar to that represented in FIGURE 8.

Instead of heat sealing the mouths of the bags, the bag openings can be efficiently closed, after filling, through the use of adhesive tape, for instance pressure sensitive tape. As shown in FIG. 9, when the bag opening is to be closed by pressure sensitive tape 32, one wall 33 of the bag extends beyond the other wall 34 at the bag opening or mouth, and the tape is positioned or guided so as to engage the edge portions of both walls 33 and 34 and thereby seal the bag opening. Naturally it is also possible to apply the adhesive tape 32 after folding an edge of one or both walls 33, 34.

It is obvious that it is not always necessary to sever the bags from each other before they are opened, filled and closed in the described way. The bags may be separated after they have been filled, or the filled bags can be rolled up as a chain or collected in zigzag line. The extent of filling and the properties of the substance filling the bags determine the method to be chosen.

Referring now to FIG. 5, it will be seen that the invention provides also a device for the manufacture of bags from a multiply strip of material which is capable of being heat sealed, for instance, a thermoplastic material, such as, polyethylene, polypropylene, and like plastic films. The device of FIG. 5 comprises a horizontal bearer 35, which is preferably capable of rotation about a central shaft, and carries a spindle 36 for unwinding a multiply strip of thermoplastic film 38 wound up so as to form a roll. The film strip 38 is guided by a roll 39 to driven delivery rolls 40 mounted on the circumference of the bearer 35. Also mounted on the bearer 35 are two endless driven endless conveyor belts 41 and 42 of elastical and heat proof material, such as, silicon rubber, which are guided by rolls 43 so that each belt has an arcuate run concentric with the axis of rotation 44 of the bearer 35. A blower 45 directing a blast of air radially outward is mounted on bearer 35 at a location behind the delivery rolls 40 considered in the direction of rotation of bearer 35 as indicated by the arrows B.

Mounted in a circular array which is concentrical with respect to the shaft 44, are stationary rod-like supports 46 extending perpendicular to the plane of the central bearer 35, so that pressure is consecutively exerted by the belts 41 and 42 against a number of the supports 46 on rotation of the central bearer 35. The supports 46 are each provided with a separate electrically energized elongated heating element 47.

The operation of the device illustrated on FIG. 5 is as follows: The central bearer is driven in the direction B and both endless belts 41, 42 are driven in the direction of the arrows C at such a speed that the arcuate runs of the belt travelling along the circumference of the central bearer 35 are stationary with respect to the supports 46. During rotation of the central bearer 35 the multiply strip 38 is delivered by the delivery rolls 40 at a speed which is higher than the circumferential speed of bearer 35. As the rolls 40 pass a support 46, the strip 38 is seized between the belt 42 and that support 46, whereupon the excessively fed material is blown outwardly by the blower 45 to form a loop 48 having its other end pinched between belt 42 and the next support 46 passed by rolls 40. Thus, successive loops 48 are repeatedly formed in strip 38 between the adjacent stationary supports 46.

After a part of the strip of material has been seized between the belt 42 and a support 46 and pressed against the latter, the elongated heating element 47 mounted thereon is energized, whereby the layers or plies of material are welded to each other. In the illustrated example only one heating element 47 is provided on each support 46, and is operative, during heating to almost sever the material along a narrow zone or line, whereby on either side of this weakened line two welded seams 49 are formed. The welds are cooled while under pressure of the belts 42 and 41, and the formed bags 50 are removed by pneumatic or mechanical means (not shown).

FIGURE 6 represents a modified embodiment of the device described above with reference to FIGURE 5, and in which the members mounted on the bearer are disposed outwardly with respect to the circle formed by the heating element supports. Corresponding parts of the device in FIGURE 6 are denoted by the same reference numerals as in FIGURE 5, but with the letter "a" appended thereto. The installation according to FIGURE 6, however is different from the preceding one, inasmuch as the formed bags are not severed from each other, but welded in a way to be described hereinafter so as to remain united and form a chain or strip 53, which is wound up and forms a roll 51 on a spindle 52 carried by the bearer 35a.

By regulating the velocity of rotation of the bearer 35 or 35a and/or the velocity of delivery rolls 40 or 40a, the size of the bags to be manufactured can be varied within ample limits, it being possible to obtain extra large sizes by rendering inoperative the heating elements 47 or 47a on alternate supports 46 or 46a.

With the devices according to the FIGURES 5 and 6, various kinds of bags can be produced by transversely welding strips, which are differently folded in the longitudinal direction, or tubular material. Examples are depicted in FIGURES 10a–10f. Ordinary flat bags can be made from the folded strip according to FIGURE 10a. As indicated on FIGURE 9, one wall of such bags can protrude beyond the other, as at 54 on FIGURE 10a, in order to facilitate opening of the bag, or to permit simple closure by adhesive tape. Represented in FIGURE 10c are folded strips which constitute two strips according to FIGURE 10a and from which double bags can be manufactured. If desired, the double bags can be severed along line 55. FIGURE 10d shows, in a corresponding way, a folded strip which constitutes two folded strips of the kind shown in FIGURE 10b, and, in this case, the bags also can be severed along the line 55.

FIGURE 10e illustrates how, starting with a flat tube, flat bags can be formed by cutting the same along the line 55 or the line 56.

FIGURE 10f shows a tube folded to constitute a doubling of the section shown in FIGURE 10b. It is obvious that, when working with strips according to the FIGURES 10c–10f, a double production can be achieved as compared with the sections according to the FIGURES 10a and 10b.

Starting from tubular material according to the sections 10e or 10f, it is also possible to manufacture bags in the longitudinal direction of the strip by the provision of transverse welded seams and perforations parallel thereto, for example, as indicated in FIGURE 11. In this case, the tube 57, which may have lateral folds 58, is provided with transverse welds 59 and perforations 60 alongside the welds. The folds 58 may then constitute lateral bellow folds of the bag.

The transverse perforations 60 in the strip can be formed in a simple way by perforators mounted on the supports 46 or 46a alongside the heating elements 47 or 47a. These perforators are preferably stationary according to the invention, so that the perforations are produced by the belts 42, 42a pressing the strip or tube against the perforators.

With the devices according to the invention it is possible to produce various types of welded seams, of which FIGURE 12 shows some examples. FIGURE 12a shows a relatively broad welded seam 61 which can be cut through or perforated along the medial line 62, so that two sufficiently strong welded seams remain at the opposite sides of the cut or perforations. FIGURE 12b shows double welded seams 63 with perforations 64 therebetween which can be obtained by providing each of the supports 46 or 46a with two heating elements which are spaced apart and have a perforator therebetween. The perforations 64 can also be formed after the heat sealing operation.

Represented in FIGURE 12c is a special welded seam according to the invention having a weakened line extending along the medial line thereof so that for some materials, such as polyethylene, a better effect is obtained in tearing apart the successive bags.

The welded seam according to FIGURE 12c is obtained by exerting a greater pressure at the middle portion of the welded seam. This can advantageously be effected by means of a heated element or strap 65 which, in cross section, is substantially V shaped, as is shown in FIGURE 13. Owing to the heat and pressure, the material of the soft layers 66 and 67 is pressed apart at the middle of the hot strap 65, with two strong welds being formed at the opposite sides of a weakened line having a thickness substantially less than the total of the thicknesses of the two layers 66 and 67.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention which is intended to be defined by the appended claims.

I claim:
1. A method of effecting the treatment, at regular intervals therealong, of a strip of pliable sheet material drawn from a compact supply thereof, comprising the steps of
  (A) uninterruptedly removing the strip material from said compact supply thereof,
  (B) continuously delivering the strip material removed from the compact supply to a closed path by means of a delivery device which is moved continuously along said closed path,
  (C) holding parts of the strip material delivered to said closed path at fixed locations along the latter for a period of time less than that required for a complete circuit of the closed path by the delivery device for the strip material.
  (D) treating said parts of the strip material while said parts are held at said fixed locations, and
  (E) releasing said parts of the strip material from said fixed locations following the treatment thereof so that the treated parts of the strip material can then be removed from said closed path.
2. The method as in claim 1; wherein said closed path is circular and extends horizontally, and said strip material is held substantially vertically at said fixed locations.
3. The method as in claim 1;
  (a) wherein the strip material has weakened lines at spaced apart locations therealong, and
  (b) wherein said strip material is continuously delivered from said supply at a speed substantially less than the linear speed of movement of said delivery device along said closed path whereby successive parts of the strip material are separated at said weakened lines and held in spaced apart relation at said fixed locations along said closed path.
4. The method as in claim 1; wherein the strip material is continuously delivered from said supply at a speed substantially greater than the linear speed of movement of said delivery device along said closed path so that the lengths of the strip material between said fixed locations at which the strip material is held are greater than the distances along said closed path between said fixed locations.
5. The method as in claim 1;
  (a) wherein said strip material is in the form of a chain of bags joined to each other along weakened lines and having side walls with openings therebetween along one longitudinal edge of the chain, and said bags constitute the parts of the strip material held at said fixed locations; and
  (b) wherein said treating of the held parts of the strip material includes, in succession,
    (1) pulling apart said side walls of each bag adjacent the opening of the latter so as to distend said opening,
    (2) filling the bag through the distended opening thereof,
    (3) pressing together the side walls of the filled bag so as to close said opening thereof, and
    (4) adhering together the side walls of the bag at said opening, thereby to seal the bag.
6. The method as in claim 1;
  (a) wherein said strip material includes two layers joined together along at least one longitudinal edge of the strip, and
  (b) wherein said treating of the held parts of the strip material includes applying heat and pressure to said two layers along narrow zones extending transversely across the strip at spaced apart locations along the latter, thereby to weld together said layers at said zones and thus define bags between the latter.
7. The method as in claim 6; wherein said treating of the held parts of the strip material further includes weakening the strip material along transverse lines in said zones so as to permit separation of the successive bags at the weakened lines.
8. The method as in claim 1; further comprising the step of removing the released parts of the strip material from said closed path by means of a discharge device which moves along said closed path at the same speed as said delivery device.
9. An apparatus for treating strip material comprising
  (A) a bearer continuously moved so that each point thereon travels along a closed path, said bearer carrying
    (1) means for supporting a roll of strip material,
    (2) continuously operative means unwinding the strip material from the roll, and
    (3) continuously operative delivery means moving with said bearer along said closed path and delivering the unwound strip material to said path;
  (B) means arranged along said path and operative to hold parts of the strip material delivered to said path at a succession of fixed locations as said delivery means passes each of said fixed locations and to release the strip material at each of said fixed locations prior to the return of said delivery means to the latter; and
  (C) means treating the parts of the strip material held at said fixed locations along the closed path.
10. An apparatus as in claim 9; wherein said bearer is rotated about a fixed axis so that said closed path is circular and concentric with said axis.
11. An apparatus as in claim 10; wherein said means arranged along the circular path and operative to hold parts of the strip material includes
  (1) means defining at least elements of a fixed cylindrical surface extending along said circular path, and
  (2) at least one driven endless belt mounted on said bearer and guided to have an arcuate run extending along said circular path for pressing the delivered strip material against said elements of a fixed cylindrical surface,
    (a) said belt being driven at a linear speed equal to the speed of movement of said delivery means along said path and with said run of the belt moving in the direction opposed to the direction of movement of said delivery means so that said run is stationary with respect to said elements of the fixed cylindrical surface.
12. An appartus as in claim 11; wherein said means treating the held parts of the strip material includes heating means supported by said elements of the fixed cylindrical surface and cooperating with said arcuate run of the belt to subject the held parts of the strip material to heat and pressure.

13. An apparatus as in claim 11; wherein said means defining at least elements of a fixed cylindrical surface is constituted by a cylindrical casing coaxial with said bearer and having suction ports for causing the delivered strip material to adhere thereto.

14. An apparatus as in claim 9; further comprising a driven rewinding device on said bearer for taking-up the strip material as the latter is released from the successive fixed locations along the closed path.

15. An apparatus for continuously opening, filling and closing a chain of bags having side walls with openings therebetween along a longitudinal edge of the chain and with weakened lines between adjacent bags, comprising
(A) a bearer continuously moved so that each point thereon travels along a closed path, said bearer carrying
(1) means for rotatably supporting a chain of bags in the form of a roll,
(2) continuously operative means unwinding the chain of bags from the roll, and
(3) continuously operative delivery means moving with said bearer along said closed path and delivering the unwound chain of bags to said path;
(B) a cylindrical casing defining a wall surface extending along said closed path and having suction ports therein so as to cause one wall of each bag to adhere to said wall surface as the successive bags are delivered to said path; and
(C) at least one endless belt on said bearer guided to have a run which, at its opposite ends, is closely adjacent to said wall surface of the casing and, intermediate said opposite ends, is progressively spaced from said wall surface,
(1) said belt being continuously driven so that said run remains stationary in relation to said wall surface, and
(2) said belt having apertures therein and means associated with the belt for applying suction to said apertures so that the other wall of each bag is made to adhere to said belt for progressively distending and closing the bag opening, whereby each bag can be filled while its opening is thus distended.

16. An apparatus as in claim 15; further comprising sealing means operative on each bag after said belt to effect sealing of the opening thereof.

17. An apparatus as in claim 16; wherein said sealing means includes cooperative pressure and heat applying means on said bearer and casing, respectively.

18. An apparatus as in claim 17;
(a) wherein said heat applying means includes a succession of heating elements extending along said wall surface and energized successively after said belt passes thereby, and
(b) wherein said pressure applying means includes a second belt on said bearer having a run extending along said closed path to engage each bag after the first mentioned belt and thereby press each bag against a heating element during energization of the later, said second belt being continuously driven so that said run thereof is stationary relative to said wall surface.

19. An apparatus as in claim 16; wherein said sealing means includes means for unwinding a roll of adhesive tape carried by said bearer and applying the unwound tape to each bag across the opening thereof upon release of each bag by said belt.

20. An apparatus as in claim 15; wherein said delivery means operates at a speed greater than that of said unwinding means so that the successive bags of the chain are pulled apart at said weakened lines and delivered in spaced apart relation to said wall surface of the casing.

21. An apparatus as in claim 15; wherein said bearer rotates about a fixed axis so that said closed path is circular and concentric with said fixed axis.

22. An apparatus for producing tubular bodies, bags or containers from a continuous strip of thermoplastic material having superposed layers, comprising
(A) A bearer continuously moved so that each point thereon travels along a closed path, said bearer carrying
(1) means for rotatably supporting a roll of the strip material, and
(2) continuously operative delivery means moving with said bearer along the closed path and unwinding strip material from the roll for delivery at said path;
(B) a series of stationary spaced apart, individually energized heating elements arranged along said path; and
(C) an endless belt on said bearer guided to have a run extending along said closed path from the location on said bearer of said delivery means and being driven so that, as said bearer moves, said run remains stationary in relation to said heating elements for pressing spaced apart locations along the strip material against the successive heating elements to effect welding together of the layers of the strip material at said locations.

23. An apparatus as in claim 22;
(a) wherein said heating elements are arranged in pairs which are relatively close to each other; and
(b) further comprising perforating means disposed between each of said pairs of heating elements.

24. An apparatus as in claim 22;
wherein each of said heating elements has a substantially V-shaped cross-section with its apex directed toward said path so that said apex forms a weakened line of reduced thickness at the center of each region of the strip material at which said layers of the latter are welded together.

25. An apparatus as in claim 22; further comprising
(a) elongated, relatively narrow supports carrying said heating elements and being spaced apart along said path to define gaps therebetween; and
(b) blower means on said bearer directing a blast of air outwardly toward said path at a location immediately following said delivery means
(1) said delivery means delivering the the strip material to said path at a speed greater than the speed of movement of said delivery means along said path so that excess strip material is delivered to said path and formed into loops in said gaps by the action of said air blast on the strip material.

26. An apparatus as in claim 22; wherein said bearer is rotated about a fixed axis so that said closed path is circular and concentric with said fixed axis.

References Cited by the Examiner

UNITED STATES PATENTS

| | | | |
|---|---|---|---|
| 2,671,588 | 3/54 | Vogt | 52—187 X |
| 2,697,543 | 12/54 | Sawyer et al. | 53—187 |
| 2,754,644 | 7/56 | Vergobbi et al. | 53—29 |
| 2,847,806 | 8/58 | Wang | 53—29 |
| 2,899,786 | 8/59 | Harker | 53—187 |
| 3,004,881 | 10/61 | Van der Meulen | 93—35 X |
| 3,060,654 | 10/62 | Lubersky | 53—29 |

FRANK E. BAILEY, *Primary Examiner.*

ROBERT A. LEIGHEY, BROMLEY SEELEY, TRAVIS S. McGEHEE, *Examiners.*